OR 4,505,546

United States Patent [19]
Umeda et al.

[11] Patent Number: 4,505,546
[45] Date of Patent: Mar. 19, 1985

[54] LIQUID CRYSTAL DISPLAY DEVICE

[75] Inventors: Takao Umeda; Yuzuru Simazaki, both of Hitachi; Tatsuo Igawa, Kitaibaraki; Seikichi Tanno, Hitachi; Ken Sasaki, Mobara; Takao Miyashita, Kumagaya, all of Japan

[73] Assignee: Hitachi, Ltd., Tokyo, Japan

[21] Appl. No.: 443,032

[22] Filed: Nov. 19, 1982

[30] Foreign Application Priority Data

Nov. 20, 1981 [JP] Japan ............................ 56-185319

[51] Int. Cl.³ .............................................. G02F 1/13
[52] U.S. Cl. ................... 350/334; 350/339 R; 350/349
[58] Field of Search ................. 350/349, 339 R, 334

[56] References Cited

U.S. PATENT DOCUMENTS 4,266,859 5/1981 Togashi ......................... 350/349 X

FOREIGN PATENT DOCUMENTS 2915847 4/1980 Fed. Rep. of Germany .
3004764 8/1980 Fed. Rep. of Germany .
3129162 3/1982 Fed. Rep. of Germany .

Primary Examiner—John K. Corbin
Assistant Examiner—Richard Gallivan
Attorney, Agent, or Firm—Antonelli, Terry & Wands

[57] ABSTRACT

A liquid crystal display device is disclosed in which a liquid crystal material mixed with a dichroic dye is held between a pair of substrates whose facing surfaces are provided with electrodes, so that a picture element is made up of a pair of facing portions of the electrodes and a portion of the liquid crystal material sandwiched by the facing portions, in which a reflecting plate is adjacent to one of the substrates, and in which at least one of the substrates is formed of a birefringent material having slow and fast principal axes of birefringence. In the above device, an angle between the direction of the absorption axis of the dichroic dye and one of the principal axes of birefringence of the substrate is selected so that the contrast and viewing-direction characteristic of the device can be improved.

8 Claims, 10 Drawing Figures

4,505,546

LIQUID CRYSTAL DISPLAY DEVICE

BACKGROUND OF THE INVENTION

The present invention relates to a liquid crystal display device, and more particularly to a liquid crystal display device suitable for guest-host type color display.

A guest-host type liquid crystal display device in which a dichroic dye is added to a liquid crystal material, is inferior in contrast to a twisted-nematic liquid crystal display device.

In order to overcome this problem, a method has been proposed in which a quarter-wave plate (namely, a λ/4-plate) is disposed as shown in FIG. 1 (for example, reference is made to Japanese Patent Application Laidopen Nos. 39664/1979 and 26756/1979, and others).

In FIG. 1, reference numerals 1 to 6 designate lights, 8 a liquid crystal layer in which liquid crystal molecules 9 and dichroic dye molecules 10 are aligned parallel to an X-direction, 7a and 7b a pair of substrates whose facing surfaces are provided with electrodes (not shown), 11 a quarter-wave plate having a thickness of 1 to 10 mm and made of quartz or transparent muscovite, and 12 a reflecting plate.

Referring to FIG. 1, when natural light 1 having a plurality of electric field components a impinges on the liquid crystal layer 8 through the substrate 7a, a component of the natural light parallel to the direction of the absorption axis of each dichroic dye molecule 10 (in this case, the X-component of the natural light) is absorbed by the dye molecules, and therefore light 2 having passed through the substrate 7b is linearly polarized light b having only the Y-component of the natural light. The light 2 is incident on the quarter-wave plate 11, and light 3 having passed through the quarter-wave plate 11 becomes left-circularly polarized light c in which an electric field vector rotates counterclockwise. The light 3 is reflected back from the reflecting plate 12. At this time, the direction of rotation of the electric field vector is reversed, and therefore light 4 reflected from the plate 12 is right-circularly polarized light d in which the electric field vector rotates clockwise. The light 4 is incident upon the quarter-wave plate 11, and light 5 having passed through the plate 11 becomes linearly polarized light e parallel to the X-direction. In other words, the quarter-wave plate 11 and the reflector 12 rotate the plane of polarization through 90°. When the light 5 is incident on the liquid crystal layer 8 through the substrate 7b, the electric field vector of the light 5 is parallel to the direction of the absorption axis of each dichroic dye molecule. Thus, almost all of the X- and Y-components of the incident natural light are absorbed by the dye molecules, and therefore light 6 having passed through the substrate 7a is extremely low in intensity.

When a voltage is applied across the liquid crystal layer 8, the dichroic dye molecules 10 are inclined together with the liquid crystal molecules 9, to be oriented in a Z-direction. Thus, the direction of the absorption axis of each dye molecule 10 becomes parallel to the Z-direction. Accordingly, the incident light 1 is reflected back from the reflecting plate 12 and returns to the incident side, without being absorbed by the dye molecules 10.

The contrast ratio of a liquid crystal display device is expressed by a ratio of the intensity of the light 6 in the state where the voltage is applied across the liquid crystal layer 8 to the intensity of the light 6 in the state where no voltage is applied. By using such a quarter-wave plate as shown in FIG. 1, the intensity of the light 6 in the state where no voltage is applied, is made small, and therefore the contrast ratio is made high.

While the structure of a liquid crystal device of negative display type in which a liquid crystal layer becomes transparent upon the application of a voltage thereto, is shown in FIG. 1, the contrast ratio can also be improved by using such a quarter-wave plate in a liquid crystal device of positive display type too, that is, in a liquid crystal display device in which liquid crystal molecules 9 and dichroic dye molecules 10 are first oriented perpendicularly to substrates 7a and 7b, and the dye molecules are oriented parallel to the substrates upon the application of a voltage to a liquid crystal layer so that the liquid crystal layer exhibits a color.

In the case where the quarter-wave plate 11 is interposed between the substrate 7b and reflecting plate 12 as shown in FIG. 2, a distance l in the lateral direction between a reflecting point on the front surface of the quarter-wave plate 11 and a reflecting point on the reflecting plate 12 corresponding to the reflecting point on the front surface of the plate 11 becomes large due to the thickness of the quarter-wave plate, and therefore two images 13 and 14 are obtained when the device is viewed by an observer 100 in a direction making an angle θ with the normal to the substrate. Thus, the quality of display image is greatly deteriorated. Such a difficulty becomes remarkable as the viewing angle θ is larger, and therefore the viewing-direction characteristic of the device is not good. Further, the quarter-wave plate is expensive.

SUMMARY OF THE INVENTION

It is an object of the present invention to provide a liquid crystal display device which is low in cost, excellent in contrast, excellent in viewing-direction characteristic, that is, the viewing angle dependency of the display quality is small, and high in quality of display image.

In order to attain the above object, according to a first aspect of the present invention, in a liquid crystal display device in which a liquid crystal material mixed with a dichroic dye is held between a pair of substrates whose facing surfaces are provided with electrodes, so that a picture element is made up of a pair of facing portions of the electrodes and the liquid crystal material sandwiched therebetween, and in which a reflecting plate is adjacent to one of the substrates, at least one of the substrates is formed of a birefringent material having slow and fast principal axes of birefringence, namely, a pair of principal directions of vibration.

Further, according to a second aspect of the present invention, in a liquid crystal display device in which a liquid crystal material mixed with a dichroic dye is held between a pair of substrates whose facing surfaces are provided with electrodes, so that a picture element is made up of a pair of facing portions of the electrodes and the liquid crystal material sandwiched therebetween, and in which a reflecting plate is adjacent to one of the substrates, at least the one substrate is formed of a birefringent material having slow and fast principal axes of birefringence, and an angle between the direction of the absorption axis of the dichroic dye and one of the principal axes of birefringence of the one substrate is made nearly equal to 45° when the direction of the absorption axis of the dichroic dye is aligned parallel to the one substrate.

Furthermore, according to a third aspect of the present invention, in a liquid crystal display device in which a liquid crystal material mixed with a dichroic dye is held between a pair of substrates whose facing surfaces are provided with electrodes, so that a picture element is made up of a pair of facing portions of the electrodes and the liquid crystal material sandwiched therebetween, and in which a reflecting plate is adjacent to one of the substrates, at least the other substrate is formed of a birefringent material having slow and fast principal axes of birefringence, and an angle between the direction of the absorption axis of the dichroic dye and one of the principal axes of birefringence of the other substrate is made nearly equal to 22.5° when the direction of the absorption axis of the dichroic dye is aligned parallel to the other substrate.

FIG. 3 shows an outline of a film manufactured by biaxial stretching method, which is an example of the above-mentioned birefringent material.

Referring to FIG. 3, in order to improve the transparency and mechanical properties of an unstretched film, the unstretched film is stretched in two orthogonal directions A—A' and B—B', and thus a biaxially stretched film 17 is obtained. At this time, molecules making up the film are oriented in the stretching direction, and thus orthogonal principal axes 15 and 16 of birefringence are formed in the streched film plane 17, that is, the film 17 becomes a birefringent film.

Such a birefringent film can be formed of a polyester (PET) film, a polycarbonate film, a polyvinyl chloride (PVC) film, a polysulfone (PS) film, a polypropylene (PP) film, or other films. In addition to the biaxially stretched film, a uniaxially stretched film obtained by stretching an unstretched film only in a single direction is a birefrigent film since principal axes $a_1$—$a_1'$ and $a_2$—$a_2'$ of birefringence are formed in the uniaxially stretched film.

Now, the principle of the present invention will be explained, with reference to FIG. 4, which shows a liquid crystal display device in a state that no voltage is applied across a liquid crystal layer 8.

In FIG. 4, reference numerals 0 to 5 designate lights having a wavelength $\lambda$, each of which can be divided into X- and Y-components, $E_{ox}$ and $E_{oy}$, . . . , and $E_{5x}$ and $E_{5y}$, respectively. Further, reference numerals 17a and 17b designate substrates each formed of a birefringent film, and like reference numerals in FIGS. 1 and 4 designate like or equivalent parts. Each of facing surfaces of the substrates 17a and 17b is provided with an electrode (not shown), and a picture element is made up of a pair of facing portions of the electrodes and a portion of a liquid crystal layer 8 sandwiched therebetween. Further, in FIG. 4, reference symbols $n_o$ and $n_e$ designate ordinary and extraordinary refractive indices of liquid crystal molecules 9, $n_o'$ and $n_e'$ ordinary and extraordinary refractive indices of the birefringent films 17a and 17b, $\Delta n'$ an absolute value of a difference between the refractive indices $n'_o$ and $n'_e$, d a thickness of the liquid crystal layer 8, d' a thickness of each of the birefringent films 17a and 17b, $\theta_A$ an angle between one of the principal axes of birefringence of the birefringent film 17a and the direction of orientation of the liquid crystal molecules 9 (and dichroic dye molecules 10), and $\theta_B$ an angle between one of the principal axes of birefringence of the birefringent film 17b and the direction of orientation of the liquid crystal molecules 9 (and dichroic dye molecules 10).

When the components $E_{ox}$ and $E_{oy}$ of the incident light 0 have a magnitude equal to 1 (that is $E_{ox} = E_{oy} = 1$) and the wavelength of the incident light is expressed by $\lambda$, the light 2 having passed through the liquid crystal layer 8 is given by the following equation:

$$\begin{pmatrix} E_{2X} \\ E_{2Y} \end{pmatrix} = \begin{pmatrix} e^{i\frac{2\pi n_e d}{\lambda}}, 0 \\ 0, e^{i\frac{2\pi n_o d}{\lambda}} \end{pmatrix} \cdot \begin{pmatrix} \cos\theta_A, -\sin\theta_A \\ \sin\theta_A, \cos\theta_A \end{pmatrix} \cdot$$

$$\begin{pmatrix} e^{i\frac{2\pi n'_e d'}{\lambda}}, 0 \\ 0, e^{i\frac{2\pi n'_o d'}{\lambda}} \end{pmatrix} \cdot \begin{pmatrix} \cos\theta_A, \sin\theta_A \\ -\sin\theta_A, \cos\theta_A \end{pmatrix} \cdot \begin{pmatrix} 1 \\ 1 \end{pmatrix} =$$

$$\begin{pmatrix} e^{i\frac{2\pi(n'_e d' + n_e d)}{\lambda}} \cdot (\cos\theta_A + \sin\theta_A)\cos\theta_A \\ -e^{i\frac{2\pi(n'_o d' + n_e d)}{\lambda}} \cdot (\cos\theta_A - \sin\theta_A)\sin\theta_A \\ e^{i\frac{2\pi(n'_e d' + n_o d)}{\lambda}} \cdot (\cos\theta_A + \sin\theta_A)\sin\theta_A \\ +e^{i\frac{2\pi(n'_o d' + n_o d)}{\lambda}} \cdot (\cos\theta_A - \sin\theta_A)\cos\theta_A \end{pmatrix}$$

When the intensity of the X-component of the light 2 and that of the Y-component thereof are expressed by $I_{2X}$ and $I_{2Y}$, respectively, the intensities $I_{2X}$ and $I_{2Y}$ are given by the following equations:

$$I_{2X} = |E_{2X}|^2 = 1 + \frac{1}{2}\left(1 - \cos\frac{2\pi\Delta n' \cdot d'}{\lambda}\right)\sin 4\theta_A \tag{2}$$

$$I_{2Y} = |E_{2Y}|^2 = 1 - \frac{1}{2}\left(1 - \cos\frac{2\pi\Delta n' \cdot d'}{\lambda}\right)\sin 4\theta_A \tag{3}$$

The X-component $E_{2X}$ is absorbed by the dichroic dye 10 in the liquid crystal layer 8, and the intensity $I_{2X}$ vanishes. Thus, only the intensity $I_{2Y}$ is theoretically recieved by the birefrient film 17b. When the angle $\theta_A$ is equal to zero, the intensities $I_{2X}$ and $I_{2Y}$ are both equal to 1, that is, there are obtained the same results as in the case where the substrate 17a is made of an optically homogeneous material such as glass.

Further, it is known from Equation (2) that, when the angle $\theta_A$ is equal to 22.5° (namely, $\pi/8$), the intensity $I_{2X}$ becomes maximum and the intensity $I_{2Y}$ becomes minimum, that is, the light quantity absorbed by the dichroic dye becomes maximum and the light quantity incident on the birefrientent film 17b becomes minimum.

Accordingly, it is known that the contrast becomes maximum when the angle $\theta_A$ is made equal to 22.5°. Further, it is known from Equations (2) and (3) that the intensity $I_{2X}$ has a maximum value and the intensity $I_{2Y}$ has a minimum value, when the following relation is satisfied:

$$\Delta n' \cdot d' = \frac{\lambda}{2}(2k + 1)$$

where k is a positive integer, for example, 1 or 2.

The light 2 having passed through the liquid crystal layer 8 impinges on the birefringent film 17b, and the light 3 emerges therefrom. The X- and Y-components $E_{3X}$ and $E_{3Y}$ of the light 3 are given by the following equation:

$$\begin{pmatrix} E_{3X} \\ E_{3Y} \end{pmatrix} = \begin{pmatrix} \cos\theta_B, & -\sin\theta_B \\ \sin\theta_B, & \cos\theta_B \end{pmatrix} \begin{pmatrix} e^{i\frac{2\pi n'_e d'}{\lambda}}, & 0 \\ 0, & e^{i\frac{2\pi n'_o d'}{\lambda}} \end{pmatrix} \cdot \qquad (4)$$

$$\begin{pmatrix} \cos\theta_B, & \sin\theta_B \\ -\sin\theta_B, & \cos\theta_B \end{pmatrix} \begin{pmatrix} 0 \\ E_{2Y} \end{pmatrix} =$$

$$\begin{pmatrix} \sin\theta_B \cos\theta_B\, e^{i\frac{2\pi n'_e d'}{\lambda}} - \sin\theta_B \cos\theta_B\, e^{i\frac{2\pi n'_o d'}{\lambda}} \\ \sin^2\theta_B\, e^{i\frac{2\pi n'_e d'}{\lambda}} + \cos^2\theta_B\, e^{i\frac{2\pi n'_o d'}{\lambda}} \end{pmatrix}$$

Now, let us assume that the reflecting plate 12 is a perfect reflector. Then, the X- and Y-components $E_{4X}$ and $E_{4Y}$ of the light 4 are given by the following equation:

$$\begin{pmatrix} E_{4X} \\ E_{4Y} \end{pmatrix} = \begin{pmatrix} 1 & 0 \\ 0 & -1 \end{pmatrix} \begin{pmatrix} E_{3X} \\ E_{3Y} \end{pmatrix} = \qquad (5)$$

$$E_{2Y} \begin{pmatrix} \sin\theta_B \cos\theta_B\, e^{i\frac{2\pi n'_e d'}{\lambda}} - \sin\theta_B \cos\theta_B\, e^{i\frac{2\pi n'_o d'}{\lambda}} \\ -\sin^2\theta_B\, e^{i\frac{2\pi n'_e d'}{\lambda}} - \cos^2\theta_B\, e^{i\frac{2\pi n'_o d'}{\lambda}} \end{pmatrix}$$

The light 4 impinges on the birefringent film 17b, and the light 5 emerges therefrom. The X- and Y-components $E_{5X}$ and $E_{5Y}$ of the light 5 are given by the following equations:

$$\begin{pmatrix} E_{5X} \\ E_{5Y} \end{pmatrix} = \begin{pmatrix} \cos\theta_B, & \sin\theta_B \\ -\sin\theta_B, & \cos\theta_B \end{pmatrix} \begin{pmatrix} e^{i\frac{2\pi n'_e d'}{\lambda}}, & 0 \\ 0, & e^{-i\frac{2\pi n'_o d'}{\lambda}} \end{pmatrix} \cdot$$

$$\begin{pmatrix} \cos\theta_B, & -\sin\theta_B \\ \sin\theta_B, & \cos\theta_B \end{pmatrix} \begin{pmatrix} E_{4X} \\ E_{4Y} \end{pmatrix}$$

$$E_{5X} = \tfrac{1}{2} E_{2Y} \sin 2\theta_B \left\{ \left( \cos\frac{4\pi n'_e d'}{\lambda} - \cos\frac{4\pi n'_o d'}{\lambda} \right) + \right. \qquad (6)$$

$$\left. i \left( \sin\frac{4\pi n'_e d'}{\lambda} - \sin\frac{4\pi n'_o d'}{\lambda} \right) \right\}$$

$$E_{5Y} = -E_{2Y} \left[ \left\{ \sin^2\theta_B \cos\left(\frac{4\pi n'_e d'}{\lambda}\right) + \right. \right. \qquad (7)$$

$$\cos^2\theta_B \cos\left(\frac{4\pi n'_o d'}{\lambda}\right) \right\} +$$

$$\left. i \left\{ \sin^2\theta_B \sin\left(\frac{4\pi n'_e d'}{\lambda}\right) + \cos^2\theta_B \sin\left(\frac{4\pi n'_o d'}{\lambda}\right) \right\} \right]$$

Respective intensities $I_{5X}$ and $I_{5Y}$ of the X- and Y-components of the light 5 are given by the following equations:

$$I_{5X} = |E_{5X}|^2 = \tfrac{1}{2} I_{2Y} \sin^2 2\theta_B \left\{ 1 - \cos\left(\frac{4\pi \Delta n' \cdot d'}{\lambda}\right) \right\} \qquad (8)$$

$$I_{5Y} = |E_{5Y}|^2 = \qquad (9)$$

$$I_{2Y} \left[ 1 - \tfrac{1}{2} \sin^2 2\theta_B \left\{ 1 - \cos\left(\frac{4\pi \Delta n' \cdot d'}{\lambda}\right) \right\} \right]$$

It is known from Equation (8) that the light quantity absorbed by the dichroic dye becomes maximum when the angle $\theta_B$ is equal to 45° (namely, $\pi/4$), and further it is known from Equation (9) that the light quantity having passed through the liquid crystal layer 8 becomes minimum when the angle $\theta_B$ is equal to 45°. Thus, it is known that the contrast becomes maximum when the angle $\theta_B$ is equal to 45°.

Further, it is known from Equations (8) and (9) that the intensity $I_{5X}$ has a maximum value and the intensity $I_{5Y}$ has a minimum value, when the following relation is satisfied:

$$\Delta n' \cdot d' = \frac{\lambda}{4}(2k + 1) \qquad (10)$$

where k is a positive integer such as 1 or 2.

Other objects and features of the present invention will become apparent from the following explanation of embodiments.

DESCRIPTION OF THE PREFERRED EMBODIMENTS

Next, the present invention will be explained on the basis of embodiments thereof.

EMBODIMENT 1

Figure 5A:
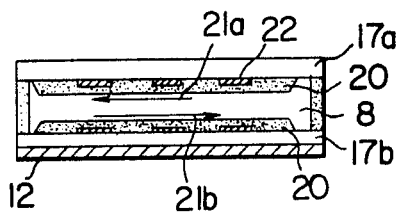
FIG. 5A is a diagrammatic sectional view showing a first embodiment of a liquid crystal display device according to the present invention.
Figure 5B:
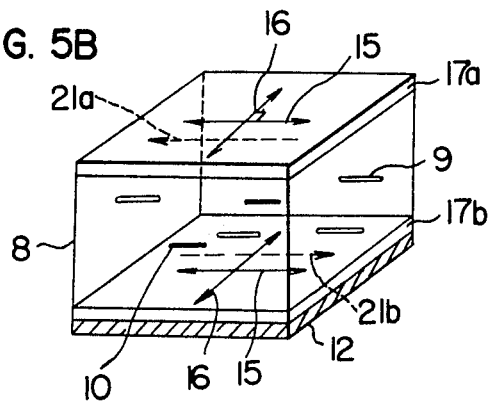
FIG. 5B is a diagrammatic perspective view of the first embodiment shown in FIG. 5A.

FIG. 5A is a diagrammatic sectional view showing a first embodiment of a liquid crystal display device according to the present invention, and FIG. 5B is a diagrammatic perspective view of the first embodiment.

In FIGS. 5A and 5B, reference numeral 8 designates a liquid crystal layer in which a dichroic dye is mixed with a nematic liquid crystal ZLI-1132 (trade name) manufactured by Merck Co., 17a and 17b substrates each formed of a biaxially stretched PET film of 206 $\mu$m in thickness, 22 an electrode formed on each of facing surfaces of the substrates 17a and 17b and made of indium oxide, 20 an orientation film made of a material of the polyamide group and rubbed with buffing cloth in a direction 21a or 21b, and 12 a reflecting plate. The gap between the substrates 17a and 17b is made nearly equal to, for example, 10 $\mu$m.

In the present embodiment, the directions 21a and 21b in which the orientation film on each of the substrates 17a and 17b is rubbed, that is, liquid crystal molecules 9 and dichroic dye molecules 10 are oriented, are made parallel to one of the principal axes 15 and 16 of birefriengence of each substrate, and made perpendicular to the other principal axis. In such a state as shown in FIG. 5B, the dichroic dye molecules 10 absorb light having an electric field vector parallel to the directions 21a and 21b.

In the present embodiment, the biaxially stretched PET film which is a birefriengent film, is used to form the substrates. Therefore, the present embodiment is low in cost and excellent in contrast, and a double image observed in the prior art device is hard to generate in the present embodiment.

EMBODIMENT 2

Figure 6:
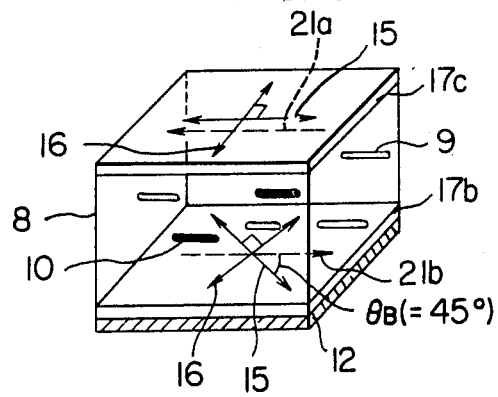
FIGS. 6, 7 and 8 are diagrammatic perspective views showing second, third and fourth embodiments of a liquid crystal display device according to the present invention.

FIG. 6 is a diagrammatic perspective view showing a second embodiment of the present invention.

The second embodiment shown in FIG. 6 is the safe as the first embodiment shown in FIGS. 5A and 5B, except that the principal axes 15 and 16 of birefriengence of the substrate 17b which is adjacent to the reflecting plate 12, make an angle of about 45° (namely, $\pi/4$) with the direction 21b in which the liquid crystal molecules 9 and dichroic dye molecules 10 are oriented.

In the present embodiment, the angle $\theta_B$ is equal to 45°. Accordingly, the light quantity absorbed by the dichroic dye 10, that is, the light quantity $I_{5X}$ given by Equation (8) becomes maximum, and the light quantity passing through the liquid crystal layer 8, that is, the light quantity $I_{5Y}$ given by Equation (9) becomes minimum. Thus, the contrast is improved.

EMBODIMENT 3

Figure 7:
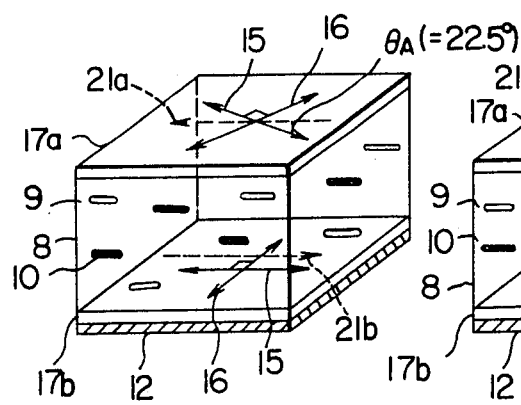

FIG. 7 is a diagrammatic perspective view showing a third embodiment of the present invention.

The third embodiment shown in FIG. 7 is the same as the first embodiment shown in FIGS. 5A and 5B, except that one of the principal axes 15 and 16 of birefringence of the substrate 17a which is spaced part from the reflecting plate 12, makes an angle of about 22.5° (namely, $\pi/8$) with the direction 21a in which the liquid crystal molecules 9 and dichroic dye molecules 10 are oriented.

In the present embodiment, the angle $\theta_A$ is equal to 22.5°. Accordingly, the light quantity absorbed by the dichroic dye, that is, the light quantity $I_{2X}$ given by Equation (2) becomes maximum, and the light quantity having passed through the liquid crystal layer 8 and incident on the substrate 17b, that is, the light quantity $I_{2Y}$ given by Equation (3) becomes minimum. Thus, the contrast is improved.

EMBODIMENT 4

Figure 8:
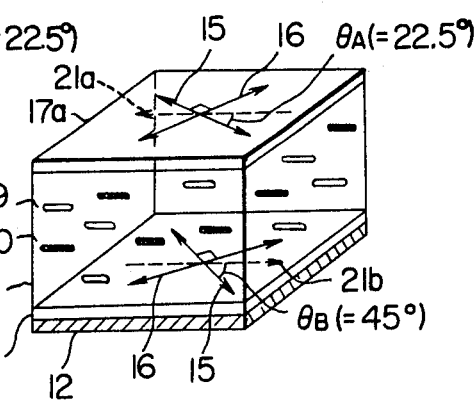

FIG. 8 is a diagrammatic perspective view showing a fourth embodiment of the present invention.

The fourth embodiment shown in FIG. 8 is the same as the first embodiment shown in FIGS. 5A and 5B, except that the angle $\theta_A$ and $\theta_B$ are made equal to 22.5° (namely, $\pi/8$) and 45° (namely, $\pi/4$), respectively. According to the present embodiment, each of the above-mentioned $I_{2X}$ and $I_{5X}$ becomes maximum, and each of $I_{2Y}$ and $I_{5Y}$ becomes minimum. Thus, the contrast is more improved.

Figure 1:
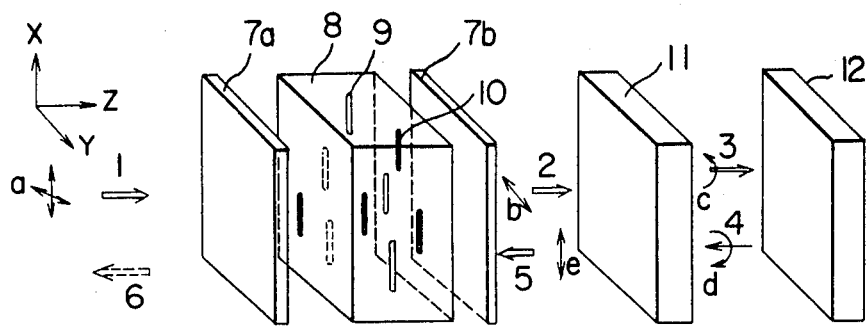
FIG. 1 is an exploded view for showing the structure of a liquid crystal display device according to a prior art.
Figure 2:
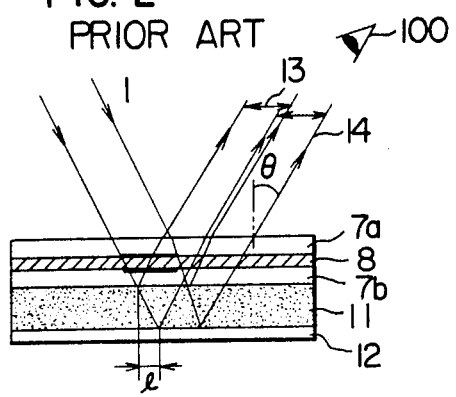
FIG. 2 is a diagrammatic sectional view of the liquid crystal display device shown in FIG. 1.
Figure 3:
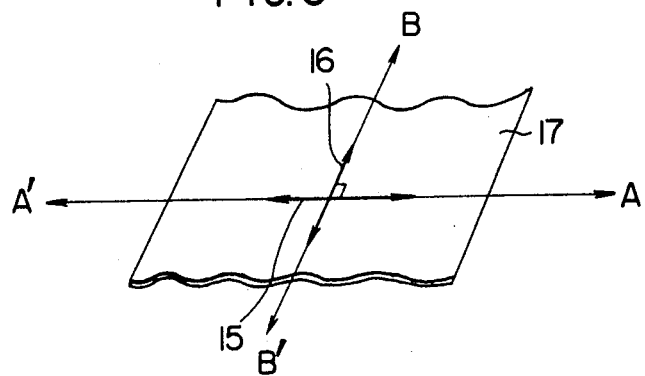
FIG. 3 is a perspective view showing a birefringent film used in embodiments of the present invention.
Figure 4:
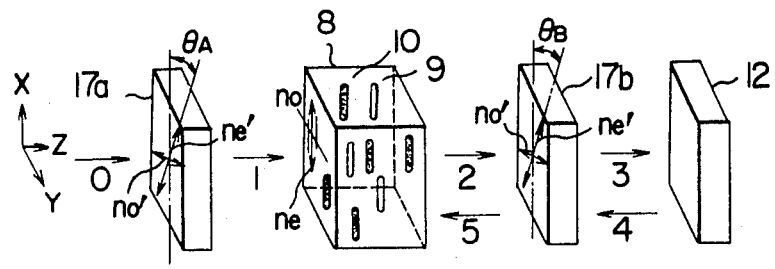
FIG. 4 is an exploded view for explaining the principle of the present invention.
Figure 9:
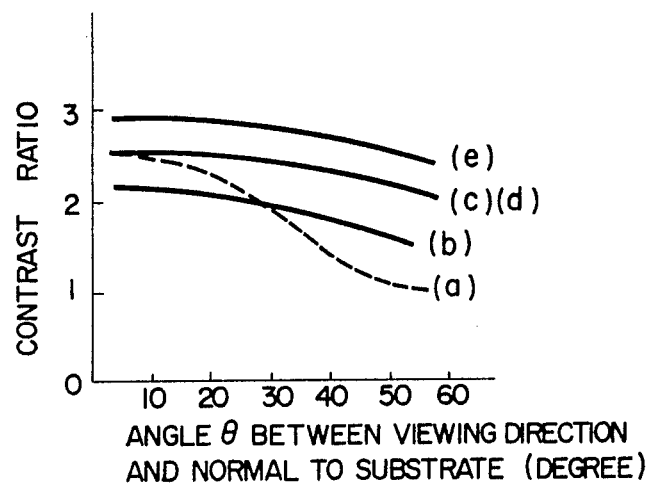
FIG. 9 is a graph showing the dependence of contrast ratio on viewing direction in each of the prior art device shown in FIG. 2 and the first, second, third and fourth embodiments of the present invention.

The present inventors measured the dependence of the contrast ratio of the viewing direction (that is, the angle $\theta$ shown in FIG. 2) for each of the prior art devices shown in FIG. 2 and the first, second, third and fourth embodiments of the present invention shown in FIGS. 5A, 5B, 6, 7 and 8. FIG. 9 shows the results of the above measurements.

In FIG. 9, a curve a indicates the results of measurements which were obtained in the case where the prior art device shown in FIG. 2 included 1 mm thick glass substrates and a 5-mm thick quarter-wave plate, and curves b, c, d and e indicate the results of measurements which were obtained with the first, second, third and fourth embodiments shown in FIGS. 5A and 5B and FIGS. 6 to 8.

As can be seen from FIG. 9, the curve a obtained with the prior art device shows that the contrast ratio decreases greatly as the angle $\theta$ is larger, due to the thickness of the glass substrates and quarter-wave plate. On the other hand, the curves b, c, d, and e shows that, in the embodiments of the present invention, the contrast ratio decreases only a little when the angle $\theta$ is made large, and therefore an excellent viewing-direction characteristic is obtained.

Further, of the embodiments of the present invention, the fourth embodiment in which the principal axes of birefringence of each of the substrates 17a and 17b are appropriately oriented, is most excellent in contrast ratio.

Further, the present inventors made liquid crystal display devices having the structures shown in FIGS. 5A and 5B and FIGS. 6 to 8 by using a phase-change guest-host liquid crystal in which a dichroic dye was mixed with a chiralnematic liquid cyrstal, and measured the dependence of the contrast ratio on the viewing direction (that is, the angle $\theta$) for each of these liquid crystal display devices. The chiralnematic liquid crystal was obtained by adding a cholesteric liquid crystal CB-15 (trade name) to a nematic liquid crystal ZLI-1132 (trade name). The results of measurements were similar to those shown in FIG. 9.

In the above-mentioned embodiments of the present invention, liquid crystal display devices of negative display type have been shown in which an orientation film on each substrate is treated so that liquid crystal molecules and dichroic dye molecules are aligned parallel to the substrate. However, the present invention is not limited to such negative display devices, but is applicable to a liquid crystal display device of positive display type in which liquid crystal molecules and dichroic dye molecules are first aligned perpendicularly to substrates, and oriented parallel to the substrates upon the application of a voltage, to exhibit a color. That is, in both of the negative and positive display devices, the angular relation between the absorption axis of the dichroic dye and the principal axes of birefringence of each substrate is appropriately considered in the state that the absorption axis of the dichroic dye is made parallel to the substrate.

The biaxially stretched PET film has been used in the above-mentioned embodiments, by way of example. However, as mentioned previously, a monoaxially stretched film may be used, and further a birefringent film made of polycarbonate, polyvinyl chloride, polysulfone, polypropylene, or the like may be used in the present invention.

That is, the present invention is not limited to the above-mentioned embodiments, but various changes and modifications can be made without departing from the spirit and scope of the invention.

As has been explained in the foregoing, according to the present invention, a liquid crystal display device can be obtained which is low in cost, very excellent in contrast, excellent in viewing-direction characteristic, and high in quality of display image.

We claim:

1. A liquid crystal display device comprising:
   a pair of facing substrates, each of said substrates being provided with at least an electrode at a registered portion, at least one of said substrates being formed of a birefringent material having slow and fast axes of birefringence;
   a liquid crystal material mixed with a dichroic dye and held between said substrates, a picture element being made up of a pair of said registered electrodes and a portion of said liquid crystal material sandwiched between said electrodes; and
   a reflecting plate adjacent to one of said substrates;
   wherein the other substrate is formed of said birefringent material having a slow and fast principal axes of birefringence, and an angle between the direction of the absorption axis of said dichroic dye and one of said principal axes of birefingence of said other substrate is made substantially equal to 22.5° when the direction of the absorption axis of said dichroic dye is aligned parallel to said other substrate.

2. A liquid crystal display device accroding to claim 1, wherein said one substrate adjacent to said reflecting plate is formed of said birefringent material having slow and fast principal axes of birefringence, and an angle between the direction of the absorption axis of said dichroic dye and one of said principal axis of birefringence of said one substrate is made substantially equal to 45° when the direction of the absorption axis of said dichroic dye is aligned parallel to said one substrate.

3. A liquid crystal display device according to claim 2 wherein said birefringent material is a birefringent film.

4. A liquid crystal display device according to claim 3, wherein said birefringent film is made of one selected from a group consisting of polyester, polycarbonate, polyvinyl chloride, polysulfone and polypropylene.

5. A liquid crystal display device according to claim 3, wherein said birefringent film is one of a biaxially stretched film and a monoaxially stretched film.

6. A liquid crystal display device according to claim 1, wherein said birefringent material is a birefringent film.

7. A liquid crystal display device according to claim 6, wherein said birefringent film is made of one selected from a group consisting of polyester, polycarbonate, polyvinyl chloride, polysulfone and polypropylene.

8. A liquid crystal display device according to claim 6, wherein said birefringent film is one of a biaxially stretched film and a monoaxially stretched film.

* * * * *